(12) United States Patent
Paiva et al.

(10) Patent No.: US 6,727,309 B1
(45) Date of Patent: Apr. 27, 2004

(54) FLOOR FINISH COMPOSITION

(75) Inventors: Adriana Paiva, Woodbury, MN (US); Brant U. Kolb, Afton, MN (US); Susan K. Yarmey, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/266,822

(22) Filed: Oct. 8, 2002

(51) Int. Cl.[7] ............................................... C08F 216/04
(52) U.S. Cl. ....................... 524/438; 524/431; 524/437; 524/261; 524/265; 524/266; 526/307.6; 526/307.7; 525/237.8; 428/422.8
(58) Field of Search .................................. 524/431, 430, 524/432, 272, 271, 266, 566, 588, 492, 524, 731, 730, 438, 437, 261, 265; 520/69; 428/422.8, 424.2; 526/307.6, 307.7; 525/237.8

(56) References Cited

U.S. PATENT DOCUMENTS

| | | |
|---|---|---|
| 3,689,300 A | 9/1972 | Bunger et al. |
| 6,197,844 B1 * | 3/2001 | Hamrock et al. ........... 522/167 |
| 6,416,838 B1 * | 7/2002 | Arney et al. ................ 428/64.7 |
| 2002/0147258 A1 * | 10/2002 | Yarmey et al. ............. 524/262 |

FOREIGN PATENT DOCUMENTS

| | | |
|---|---|---|
| JP | 06-080933 | 3/1994 |
| JP | 08-041382 | 2/1996 |
| JP | 11-001630 | 1/1999 |
| WO | WO 98/11168 | 3/1998 |
| WO | WO 98/027162 | 6/1998 |
| WO | WO 02/20678 | 3/2002 |
| WO | WO 02/070612 | 9/2002 |

\* cited by examiner

*Primary Examiner*—David W. Wu
*Assistant Examiner*—Satya Sastri
(74) *Attorney, Agent, or Firm*—Sean J. Edman

(57) ABSTRACT

One aspect of the present invention provides an aqueous surface finish composition comprising a film-forming, reversibly crosslinked, emulsion-based polymer composition, and a surface modified inorganic particle material. The surface modified inorganic particle material is dispersed within the emulsion-based polymer composition, and enhances performance characteristics of a resultant film including hardness, modulus, as well as scratch and soil resistance. The floor finish composition is shelf stable and is particularly well suited for application to floor surfaces, but also to other substrate surfaces such as walls and bathroom surfaces.

32 Claims, No Drawings

FLOOR FINISH COMPOSITION

BACKGROUND OF THE INVENTION

The present invention relates to a wet emulsion finish composition useful for providing a coating or film to a substrate surface such as a floor. More particularly, it relates to an emulsion finish composition incorporating surface modified inorganic particles providing enhanced shelf stability and film performance, and methods of preparing the same.

Polymer compositions are used in the formulation of various coating compositions such as floor finishes or polishes, for example. Commercially available floor finish compositions typically are aqueous emulsion-based polymer compositions comprising one or more organic solvents, plasticizers, coating aides, anti-foaming agents, polymer emulsions, metal complexing agents, waxes, and the like. The polymer composition is applied to a floor surface and then allowed to dry in air, normally at ambient temperature and humidity. A film is formed that serves as a protective barrier against soil deposited on the floor by pedestrian traffic, for example. These same polymer compositions can be applied to other substrate surfaces for which protection is desired, such as tile floors, walls, furniture, windows, counter tops, and bathroom surfaces, to name but a few.

Although many of the commercially available aqueous floor finishes have performed well and have experienced at least some commercial success, opportunities for improvement remain. In particular, it is highly desirable that the resultant floor finish film exhibits certain physical and performance characteristics including hardness, scratch resistance, soil resistance, black marks/scuff resistance, and abrasion resistance. Unfortunately, for applications in which an enhanced floor finish film hardness or resistance to deterioration is of great importance, currently available aqueous floor finish compositions may be less than satisfactory.

A primary factor in finish film hardness is the emulsion polymer formulation. A metal complexing agent included in the floor finish composition ionically bonds to the polymers when the composition is dried, resulting in the protective film. This reaction is reversible and the film is easily removed by a stripper solution when desired. In this regard, most aqueous floor finish polymer emulsions are polyacrylate-based. While other polymers (e.g., styrene) substituted for, or combined with, the acrylic polymer and/or additives such as coalescing agents or plasticizers can affect the resultant film hardness, only marginal improvements are typically achieved. Because resultant film hardness and deterioration resistance are a function of the types of solids within the formed film, a more viable approach may be to add hard, inorganic particles to the emulsion polymer matrix. In theory, these inorganic particles would increase the resulting film hardness, making the finish harder and improving properties such as scratch resistance and soil resistance. While promising, simply adding these particles does not result in a commercially viable product. In particular, the inorganic particles will not remain dispersed in the wet polymer composition, but instead readily precipitate (see Comparative Example 1 below).

Floor finish manufacturers continually strive to provide improved hardness, abrasion resistance, and soil resistance properties. To this end, the addition of inorganic, hard particles appears promising. Unfortunately, current efforts have not produced a shelf stable product. Thus, a need exists for a surface finish composition exhibiting enhanced bulk properties via inorganic nanoparticles that will not precipitate over extended periods of time.

SUMMARY OF THE INVENTION

One aspect of the present invention provides an aqueous surface finish composition comprising a film-forming, reversibly crosslinked, emulsion-based polymer composition, and a surface modified inorganic particle material. The surface modified inorganic particle material is dispersed within the polymer matrix, and enhances performance characteristics of a film produced by the composition following application to a surface, including hardness, modulus, and scratch and soil resistance. The composition is particularly well suited for application to floor surfaces, but also to other substrate surfaces such as walls, counter tops, furniture, windows, and bathroom surfaces.

Typically, the surface modified inorganic particle material consists of particles surface modified by a coupling agent. In general terms, the coupling agent stabilizes the inorganic particles within the aqueous polymer composition, and renders the inorganic particles compatible with the polymer composition once dried. Preferably, the surface modified inorganic particle material comprises silica nanoparticles surface modified by a silane coupling agent. The ratio (by weight) of emulsion polymer composition solids to surface modified inorganic particle material solids is preferably in the range of 1:1–10:1, more preferably 3:1–5:1.

Polymers of the polymer composition are preferably acrylic polymers, acrylic copolymers, styrene-acrylic copolymers, or blends thereof. In one preferred embodiment, the polymer component is a blend of an acrylic polymer and a urethane polymer, or alternatively, acrylic urethane copolymers, with the urethane enhancing the toughness of the resultant film. The finish composition can also contain certain alkali soluble resins, waxes, permanent and fugitive plasticizers, defoamers, wetting agents, metal complexing agents and biocides.

Another aspect of the present invention provides a process for improving the performance of an emulsion-based polymer surface finish composition by dispersing a surface modified inorganic particle material within the polymer matrix. Another aspect of the present invention relates to a method of preparing the surface finish composition of the present invention.

DETAILED DESCRIPTION OF THE PREFFERED EMBODIMENTS

The present invention provides an aqueous surface finish composition comprising a film-forming emulsion based polymer composition and a surface modified inorganic particle material dispersed within the polymer composition. The finish composition can be applied to a variety of substrates such as, for example, floor, wall, counter top, furniture, window, and bathroom surfaces. Preferably, the substrate is a floor, but can be any surface upon which the coatable compositions of the present invention can be applied such as vinyl, ceramic, wood, marble, and the like. The resultant coatings are smooth, exhibit increased hardness and modulus, and are highly resistant to scratches and soil. The inorganic particles provide for these performance enhancements, with the surface modification thereof ensuring long-term shelf stability of the finish composition.

Individual components of the emulsion-based polymer composition are described in greater detail below. In general terms, however, the polymer composition preferably includes an acrylic polymer and a metal complexing agent suspended in water. With this in mind, the inorganic particles are surface modified to ensure long-term suspension within the polymer composition. In a preferred embodiment, the surface modified inorganic particle material consists of a plurality of ceramic-type particles modified by a coupling agent. More preferably, the inorganic particles are metal oxide particles in any oxidation state. Examples of preferred metal oxides include silica, alumina, zirconia, vanadia, titania, ceria, iron oxide, antimony oxide, tin oxide, alumina/silica and combinations thereof, with silica being the most preferred. Regardless of the exact material employed, the inorganic particles are preferably nanoparticles having an average particle size (diameter) of 5–150 nm. Nanoparticles maintain transparency of the floor finish coating.

"Surface modification" of the inorganic particles is characterized by the provision of a coupling agent that modifies at least a portion of a surface of each particle. The term "surface modified particle" refers to a particle that includes surface groups attached to the surface of the particle. The surface groups modify the character of the particle. By way of background, a non-surface modified colloidal dispersion (such as inorganic particles dispersed in an aqueous medium) typically relies upon ionic stabilization to keep particles from aggregating within the medium. With respect to aqueous floor finish polymer compositions, inorganic particle ionic stabilization is difficult to achieve due to the different pHs, ionic strengths, chemical additives, cosolvents, and the like associated with these polymer compositions. Thus, inorganic particles in an aqueous floor finish polymer composition can readily aggregate with themselves and/or with the polymer emulsion particles, resulting in particle precipitation. The present invention overcomes this marked stability concern via stearic stabilization or additional ionic character provided by the coupling agent.

The coupling agent chain effectively has two ends, with the first end adhering to the outer surface of each inorganic particle, and the other end (or "tail") freely extending from the particle. The term "adhering" includes, for example, covalent bonding, hydrogen bonding, electrostatic attraction, London forces, and hydrophobic interactions. The coupling agent may be chemisorbed or physisorbed. The coupling agent may comprise organic acids, organic bases, silanes and combinations thereof. The type of coupling agent preferred will depend on the type of inorganic particle and the chemistry of the floor finish composition. The coupling agent preferably has a hydrophilic property, thus providing surface modified particle stability in the aqueous polymer composition. Further, the coupling agent is selected so as to not promote particle aggregation or aggregation with the polymer emulsion particles. Thus, the surface modified inorganic particle material will not precipitate. Further, the tail of the coupling agent chain can, depending upon formulation, interact with the polymer matrix once dried, providing a compatibilizing and/or ionic bonding effect. Similarly, with certain preferred coupling agents (for example ionically charged silane coupling agents), the tail may allow the surface modified inorganic particle material to bond to the dried polymer composition. In either case, the surface modified inorganic particle material is more compatible with the polymer composition, providing enhanced film performance.

In a preferred embodiment utilizing silica particles (more preferably silica nanoparticles), the coupling agent is a silane coupling agent. Silane coupling agents are bifunctional organosilanes, and a number of acceptable silane coupling agents are available. Acceptable silane coupling agent tails are preferably hydrophilic and may be nonionic or ionic. Nonionic silanes may include those having alcohol, amine, urea, or polyether functionality.

Acceptable nonionic coupling agents can provide the dried polymer matrix compatibility described above and include, for example, methoxyethoxyethoxyethoxyureidopropyltriethoxysilane $(CH_3CH_2O)_3Si(CH_2)_3NHC(O)OCH_2CH_2OCH_2CH_2OCH_2CH_2OCH_3$, 1-[3-(trimethoxysilyl)propyl]urea, and other polyethylene glycol based silanes. Preferred silanes are those with polyethylene glycol tails, represented by the following structure:

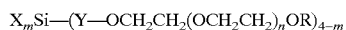

where X is a hydrolysable moity such as alkoxy, acyloxy or halogen; m is 1–3; Y is a bifunctional organic radical; n is 1–100; and R is an organic radical that does not impart hydrophobic character.

In a more preferred embodiment, ionic silane coupling agents are employed with either anionic or cationic functional groups. Anionic functional group types may include the salts of carboxylic acids, sulfonic acids, and phosphoric acids. Cationic types may include quaternary amines and protonated amines. The silane may contain one or more ionic groups per molecule. Silanes containing carboxylic acid salts are particularly advantageous for silica particle surface modification. These include carboxyethylsilanetriol, sodium salt, as well as the salts of other acid-based silane coupling agents such as 4-carboxybutyltriethoxysilane $(CH_3CH_2O)_3Si(CH_2)_4CO_2H$, 10-carboxydecyltriethoxysilane $(CH_3CH_2O)_3Si(CH_2)_{10}CO_2H$, etc. Similarly, a variety of diacid-based silane coupling agents are available, with the hydrolysis product of 3-(3-trimethysilylpropylthio)succinic anhydride, aqueous ammonia providing one acceptable formulation.

The surface modified inorganic particle material is preferably characterized by the coupling agent covering 5–100 percent of the surface area of each inorganic particle; more preferably 15–100 percent; most preferably 20–50 percent. In this regard, 100 percent surface area coverage best promotes composition stability; however from a cost standpoint, a lesser surface area coverage is preferably employed, yet still provides highly acceptable results.

The surface modification can be accomplished by any suitable means. The coupling agents are added to the suspension and allowed time to adhere to the inorganic particle surfaces. The time can range from minutes to many hours. In the case of silane coupling agents, suitable catalysis and elevated temperature may be required to complete the surface modification. In the case of ionic coupling agents, additional base may be added to neutralize the free acid or facilitate other reactions such as hydrolysis of anhydride functionality.

With the above-described surface modified inorganic particle material constraints in mind, and as previously described, the film-forming emulsion-based polymer composition can assume a wide variety of forms. In this regard, the polymer composition incorporates polymer(s) that are typically acrylic polymers, acrylic copolymers, styrene-acrylic copolymers, or blends thereof. Acrylic polymers contain only one type of acrylate monomer, whereas the acrylic copolymers comprise two or more different types of acrylate monomers. Styrene-acrylic copolymers comprise at least one type of styrene monomer and one type of acrylate monomer. The acrylate monomers include acrylic acid, butyl acrylate, ethyl acrylate, methyl acrylate, 2-ethyl hexyl acrylate, acrylonitrile, acrylimide, methacrylic acid, methyl methacrylate, ethyl methacrylate, butyl methacrylate, methacrylamide, and the like. Styrene monomers include styrene, alpha-methyl styrene, and the like.

Commercially available acrylic copolymers suitable for finishing compositions include, but are not limited to, methyl methacrylate/butyl acrylate/methacrylic acid (MMA/BA/MAA) copolymers, methyl methacrylate/butyl acrylate/acrylic acid (MMA/BA/AA) copolymers, and the like.

Suitable commercially available styrene-acrylic copolymers include, but are not limited to, styrene/methyl methacrylate/butyl acrylate/methacrylic acid (S/MMA/BA/MMA) copolymers, styrene/methyl methacrylate/butyl acrylate/acrylic acid (S/MMA/BA/AA) copolymers, and the like.

Commercially available acrylic polymers suitable for floor finish composition include, for example, Morglo II Latex from Omnova Solutions, Inc., of Chester S.C.

In a preferred embodiment, the film-forming polymer matrix incorporates accepted acrylic chemistry in combination with polyurethane. Polyurethanes and polyacrylates can be used together to achieve coatings that are both harder and tougher. In one more preferred embodiment, the film-forming polymer matrix includes a hybrid copolymer consisting of urethane and acrylic polymer chains. In an even more preferred embodiment, the acrylic urethane hybrid polymer is added to commercially available acrylic-based surface finish compositions.

The finish composition typically contains between about 5 and 50 weight percent and preferably between about 10 and 35 weight percent emulsion-based polymers based on the weight of the finish composition. Further, a weight ratio of emulsion polymer composition solids to surface modified inorganic particle material solids is preferably in the range of 1:1–10:1; more preferably 3:1–5:1.

The surface finish compositions can also contain other components such as polyvalent metal compounds, alkali soluble resins, waxes, permanent and fugitive plasticizers, defoamers, wetting agents, and biocides. The polyvalent metal compound provides crosslinking of the polymers in the film and increases the detergent resistance of the finish. Plasticizers or coalescing agents can be added to lower the temperature of film formation. Alkali soluble resins improve the ability of the finish to be stripped from the substrate before reapplication of a fresh coating. Waxes improve the gloss of the finish and allow the finish to be buffed. Biocides help minimize the formation of molds or mildew in the coating. Antifoamers and defoamers minimize the formation of bubbles in the coating.

Suitable polyvalent metals include beryllium, cadmium, copper, calcium, magnesium, zinc, zirconium, barium, strontium, aluminum, bismuth, antimony, lead, cobalt, iron, nickel, and the like. Although the polyvalent metal compound can be added to the finish composition in dry form such as powder, it is preferably added as a solution. The polyvalent metal compound is typically a metal complex, a metal salt of an organic acid, or a metal chelate. The ammonia and amine complexes of these metals are particularly useful because of their high solubility. Amines capable of complexing many metals include, for example, monoethanol amine, diethylaminoethanol, and ethylenediamine. Polyvalent metal complexes and salts of organic acids are typically soluble in an alkaline pH range. Anions of organic acids include acetate, formate, carbonate, glycolate, octanoate, benzoate, bluconate, oxalate, lactate, and the like. Polyvalent metal chelates where the ligand is a bidentate amino acid such as glycine or alanine can also be used.

Zinc and cadmium are preferred polyvalent metal ions. Preferred polyvalent metal compounds include zinc acetate, cadmium acetate, zinc glycinate, cadmium glycinate, zinc carbonate, cadmium carbonate, zinc benzoate, zinc salicylate, zinc glycolate, and cadmium glycolate. In some applications, a fugitive ligand such as ammonia is preferred. A ligand is considered fugitive if at least a portion of the ligand tends to volatilize as the finish dries to form a film on the substrate.

The alkali-soluble resins include copolymers of styrene or vinyl toluene with at least one α-β-monoethylenically unsaturated acid or anhydride such as styrene-maleic anhydride resins, rosin/maleic anhydride adducts which are condensed with polyols, and the like. The alkali-soluble resins typically have a weight average molecular weight from about 500 to 10,000 and preferably from about 1000 to 5000. The resins are often used as a conventional resin cut, which is an aqueous solution of the resin with an alkaline substance having a fugitive cation such as ammonium hydroxide. The alkali soluble resin is typically employed in amounts from 0 to about 20 weight percent and preferably in amounts from 0 to about 15 weight percent based on the weight of the finish composition.

The waxes or mixtures of waxes that can be used include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenerated coconut oil or soybean oil, and the mineral waxes such as paraffin or ceresin. The waxes typically range from 0 to about 15 weight percent and preferably from about 2 to about 10 weight percent based on the weight of the finish composition.

The aqueous finishing composition typically contains from about 1 to about 10 weight percent plasticizer based on the weight of the finish composition. The plasticizer facilitates film formation at ambient temperatures when the coating is applied to a substrate. A fugitive or semi-fugitive plasticizer is preferred over a permanent plasticizer for many applications. A fugitive or semi-fugitive plasticizer is a plasticizer that at least partially evaporates as the coating dries. Permanent plasticizers do not evaporate. Mixtures of fugitive and permanent plasticizers can be used. The particular plasticizer and the amount used are chosen in accordance with the demand for compatibility with the formulation, efficiency in lowering the film-forming temperature, and clarity of the coating.

Fugitive plasticizers or coalescents include, for example, the monobutyl, monoethyl, monomethyl or other monoalkyl ethers of diethylene glycol or diproplyleneglycol, isophorone, benzyl alcohol, butyl cellosolve, and 3-methoxybutanol-1. Permanent plasticizers include, for example, benzyl butyl phthalate, dibutyl phthalate, dimethyl phthalate, triphenyl phosphate, 2-ethyl hexyl benzylphthalate, fatty oil acid esters of caprolactam, acetyl tributyl citrate, toluene ethyl sulfonamide, tributoxyethyl phosphate, and tributyl phosphate.

The finish compositions of the invention typically have a solids content from about 10 to about 50 weight percent. In one embodiment, the solids range from about 10 to about 30 weight percent and preferably from about 15 to about 25 weight percent based on the weight of the finish composition. In another embodiment of the invention, a concentrated finish composition is provided containing up to about 35 to about 50 weight percent solids based on the weight of the finish composition. Such concentrated compositions are diluted prior to use by either mixing the concentrate with water or by applying the finish with a wet mop or applicator.

The pH of the finish composition is typically in the range of about 6 to about 10.5. Preferably, the pH is between about 7.5 and about 9.9. The pH can be adjusted using various bases or buffering agents. Suitable bases or buffering agents include, for example, borax, sodium hydroxide, alkali phosphates, alkali silicates, alkali carbonates, ammonia, and amines such as diethanolamine or triethanolamine.

Another aspect of the invention provides a method for applying the finish compositions of this invention. The finish can be applied to a variety of substrates including floor, wall, furniture, window, counter top and bathroom surfaces. The substrates can be fibers, metal, plastic, wood, stone, brick, glass, cement, concrete, ceramic masonite, dry wall, plaster, plastic, and the like. Bathroom surfaces can be countertops, shower stalls, toilets, and urinals. In one preferred embodiment, the substrate is a floor surface. The floor surface can be wood, composite vinyl tile, vinyl linoleum, asphalt, asbestos, concrete, ceramic, and the like.

The following examples and comparative examples further describe the finish compositions of the invention, methods of using the finish compositions, and the tests performed to determine the various characteristics of the finish composition. The examples are provided for exemplary purposes to facilitate an understanding of the invention, and should not be construed to limit the invention to the examples.

EXAMPLES

Glossary

Nalco 2327™—Aqueous colloidal silica sol having an average particle size of 20 nm, available from Ondeo Nalco Chemical Company of Napperville, Ill.

Nalco 2329™—Aqueous colloidal silica sol having an average particle size of 75 nm, available from Ondeo Nalco Chemical Company of Napperville, Ill.

Silquest A1230™—Nonionic silane coupling agent, available from OSi Specialties of Greenwich, Conn.

Hybridur® 580—Acrylic urethane hybrid polymer, available from Air Products of Allentown, Pa.

3M Spangle™ Floor Finish—Floor finish composition, available from 3M Company of Saint Paul, Minn.

Carboxyethylsilanetriol, sodium salt—Ionic silane coupling agent, available from Gelest Inc. of Tullytown, Pa.

3-(Triethoxysilyl)propionitrile—Precursor to ionic silane coupling agent, available from Aldrich Chemical Company of Milwaukee, Wis.

Test Methods

Spiral Scratch Test

A spiral scratch method was developed using a microtribometer (available from CETR, Inc. of Campbell, Calif.). In this test, a Tungsten Carbide ball 1/16" in diameter was used as an indenter. The sample was rotated at 400 rpm and the force was set at a range from 150 to 400 mN. Samples were examined to determine if they were scratched at each of the forces tested. The rating scale was from 0 (badly scratched) to 5 (unscratched, no change in appearance).

Nanoindentation

Elastic modulus (E) and Hardness (H) of the compositions were determined via nanoindentation using an XP Nanoindenter available from MTS of Oak Ridge, Tenn. For all experiments a diamond Berkovich probe was used. The probe was indented into the sample to 1000 nm. The variation of the modulus or hardness (if any) was obtained as a function of displacement into the sample (depth). The reported results in GigaPascals (GPa) were taken at a depth of 600 nm.

Soil Resistance

In the soiling test, new Armstrong white vinyl composite tiles from St. Paul Linoleum, St. Paul, Minn. were stripped using a 3M Super Polish (White) Floor Pad with 3M Low Odor Stripper (22H) diluted using Twist and Fill™ applicator—3M, St. Paul, Minn. A 1 ft² stripped tile section was divided in thirds. Spangle™ control and two experimental finishes were applied to the same tile (1.3 mLs of each polish was used). In particular, four coats of finish were applied and each coat was allowed to dry for at least 30 minutes. The tile was not tested until at least 24 hrs had passed. A Gardner Straight Line Washability and Abrasion Machine (Byk Gardner—Silver Spring, Md.) was used. A loop nylon kitchen style carpet was attached to the roller and 2 grams CSMA soil (Rohm & Haas, Philadelphia, Pa.) were placed on the carpet. After 25 cycles, the soil was removed and the machine was run for another 175 cycles. A visual rating was given in terms of soiling of the finish. The rating scale went from 1 to 5 with 5 being best. The control finish (Spangle™) was always given a rating of 4. The data reported in the tables below represent the results of the sample finish composition rating minus the control rating. A negative number means that the surface modified inorganic particle material finish had poorer performance than the control.

Black Mark/Scuff Resistance

Black mark and scuff resistance were determined following the procedure described in Chemical Specialty Manufacturers Association Bulletin No. 9-73, except using vinyl composite tiles. A visual rating was given in the range from 1 to 5 with 5 being best. The control finish (Spangle™) was always given a rating of 3. The data reported in the tables below represent the results of the sample finish composition rating minus the control rating. A negative number means that the surface modified inorganic particle material finish had poorer performance than the control.

Taber Abrasion Resistance

A 4"×4" square sample of coated material was prepared by using a 10 mils gap coating knife on a transparent sheet. Taber abrasion was done using a Taber Abraser model 5130 from Taber Industries of Tonawanda, N.Y., fitted with a vacuum attachment and one CS-10F wheel, 250 grams weight and a counterweight of 125 grams. Haze was measured initially and then at 100 and 300 cycles. The change of haze reported is the difference from the initial haze value. Two samples of each formulation were tested and three haze determinations per sample were taken.

Comparative Example 1

Non-Surface Modified Inorganic Particles

Samples were prepared using non-surface modified silica particles, including 20 nm silica particles (Nalco 2327™) and 75 nm silica particles (Nalco 2329™) added to a traditional floor finish (Spangle™) at ratios of 21:1, 15.3:1, 12.1:1, and 10:1 polymer composition solids to silica nanoparticles solids (by weight). With each of the 20 nm silica samples, the silica nanoparticles precipitated after thirty minutes. Similarly, the 75 nm silica samples each precipitated after approximately one day. With all samples, the rapid precipitation prevented coating of the composition to a substrate and thus evaluation of a resultant film.

Example 1

Coupling Agent Surface Area Coverage on Particle

The following surface modified inorganic particle material samples with different surface coverages were added to a traditional floor finish (Spangle™) at ratios of 2:1, 4:1, 8:1 Spangle™ solids to surface modified inorganic particle material solids. Samples were prepared using 20 nm silica particles (Nalco 2327™) and 75 nm silica particles (Nalco 2329™), with coupling agent surface area coverages of 5 percent, 10 percent, and 15 percent. The fractional surface coverage was based on typical monolayer coverage for each particle size.

For 5 percent coverage of 20 nm silica particles, 199.97 grams of Nalco 2327™ were charged to a 16-oz. jar. 1.26 grams of Silquest A1230 and 200.55 grams D.I. water were mixed and added to the Nalco 2327™ with stirring. The jar was sealed and heated to 80° C. for 16 hours. For 10 percent coverage, 200.29 grams of Nalco 2327 were charged to a 16-oz. jar. 2.52 grams of Silquest A1230 and 200.28 grams of D.I. water were mixed and added to the Nalco 2327 with stirring. The jar was sealed and heated to 80° C. for 16 hours. For 15 percent coverage, 200.27 grams of Nalco 2327™ were charged to a 16-oz. jar. 3.78 grams of Silquest A1230 and 203 grams of D.I. water were mixed and added to the Nalco 2327™ with stirring. The jar was sealed and heated to 80° C. for 16 hours.

For 5 percent coverage of 75 nm silica particles, 200.39 grams of Nalco 2329™ were changed to a 16-oz. jar. 0.3 grams of Silquest A1230™ and 201.34 grams of D.I. water were mixed and added to the Nalco 2329™ with stirring. The jar was sealed and heated to 80° C. for 16 hours. For 10 percent coverage, 199.63 grams of Nalco 2329™ were charged to a 16-oz. jar. 0.63 grams of Silquest A1230 and 201.78 grams of D.I. water were mixed and added to the Nalco 2329 with stirring. The jar was sealed and heated to 80° C. for 16 hours. For 15 percent coverage, 200.82 grams of Nalco 2329™ were charged to a 16-oz. jar. 0.94 grams of Silquest A1230™ and 206.0 grams of D.I. water were mixed and added to the Nalco 2329™ with stirring. The jar was sealed and heated to 80° C. for 16 hours.

Following formulation of each of the above surface modified inorganic particle materials into 3M Spangle™, the compositions were monitored for seven days for possible precipitation of the silica nanoparticles. As shown in Table 1, the compositions remained stable (i.e., the silica particles remained in suspension) for the entire test period.

TABLE 1

| Size of silica particles (nm) | % Coverage | Stability at 2:1, 4:1, and 8:1 Spangle ™ solids to inorganic particle material solids (by weight) |
|---|---|---|
| 75 | 5 | stable |
| 75 | 10 | stable |
| 75 | 15 | stable |
| 20 | 5 | stable |
| 20 | 10 | stable |
| 20 | 15 | stable |

Example 2

Finish with a Non-ionic Surface Modified Inorganic Particle Material

Emulsion-based floor finish sample compositions containing a non-ionic-surface modified inorganic particle material were formulated using two different size silica particles (20 nm and 75 nm). The organic used to surface modify these particles with 20 percent coverage was A1230. For the 20 nm samples, 399.75 grams of Nalco 2327™ were charged to a 32-oz. jar. 10.24 grams of Silquest A1230™ and 400 grams of D.I. water were mixed and added to the Nalco 2327™ with stirring. The jar was sealed and heated to 80° C. for 16 hours. The modified sol was then dialyzed using Spectra/Por 2 tubing (MWCO 12,000–14,000). Three tubes were filled (515 g total) and dialyzed against D.I. water (4 lt) for 48 hours. For the 75 nm samples, 400.33 grams of Nalco 2329™ were charged to a 32-oz. jar. 2.47 grams of Silquest A1230™ and 400.0 grams D.I. water were mixed and added to the Nalco 2329™ with stirring. The jar was sealed and heated to 80° C. for 16 hours. The surface modified inorganic particle material samples were then formulated with a conventional floor finish (Spangle™). In particular, several compositions were made for each silica particle size, including 8:1, 4:1, and 2:1 Spangle™ solids to surface modified inorganic particle material solids (by weight). The resulting compositions, along with a control finish (designated as "Spangle™" in Table 2A) having no surface modified inorganic particle material, were tested for scratch resistance (microtribometer—spiral scratch and nanoindenter), black mark resistance, and soil resistance.

For the spiral scratch test, a visual rating of 0 to 5 was given, where 0 was poor and 5 was best. At 5, no scratching at that load was observed. The results of the spiral scratch test are reported in Table 2A. As shown, the surface modified inorganic particle material significantly improved scratch resistance.

TABLE 2A

| | | Spangle ™:20 nm non-ionic surface modified silica | | | Spangle ™:75 nm non-ionic surface modified silica | | |
|---|---|---|---|---|---|---|---|
| Force mN | Spangle ™ Rating | 8:1 | 4:1 Rating | 2:1 | 8:1 | 4:1 Rating | 2:1 |
| 150 | 0 | 5 | 5 | 5 | 5 | 5 | 5 |
| 200 | 0 | 5 | 5 | 5 | 5 | 5 | 5 |
| 250 | 0 | 4 | 5 | 5 | 4 | 5 | 5 |
| 300 | 0 | 4.5 | 5 | 5 | 5 | 5 | 5 |
| 350 | 0 | 4.5 | 5 | 5 | 5 | 5 | 5 |
| 400 | 0 | 4 | 4 | 5 | 5 | 5 | 4 |

The scratch resistance characteristics of the samples of Example 2 were further evaluated by nanoindentation (to determine modulus and hardness at a depth of 600 nm). The nanoindentation results are provided in Table 2B. The elastic modulus increased with the addition of surface modified silica particle material for both 20 nm and 75 nm silica groupings. Hardness increased with the addition of the surface modified 20 nm silica particle material, while a slight change was observed with additional amounts of the surface modified 75 nm silica particle material.

TABLE 2B

| Sample | Elastic Modulus (GPa) | Hardness (GPa) |
|---|---|---|
| Spangle ™ | 3.18 | 0.09 |
| Spangle ™: 75 nm Surface modified Silica | | |
| 8:1 | 3.29 | 0.08 |
| 4:1 | 3.77 | 0.09 |
| 2:1 | 4.69 | 0.09 |
| Spangle ™: 20 nm Surface modified Silica | | |
| 8:1 | 3.31 | 0.08 |
| 4:1 | 4.14 | 0.10 |
| 2:1 | 4.80 | 0.11 |

The soil resistance test results are reported in Table 2C. To reiterate, the control finish (Spangle™) was always given a rating of 4 and the data reported in Table 2C represents the results of the sample finish composition rating minus the control rating. The soil resistance improved with the addition of the surface modified 20 nm silica particle material. For black mark/scuff resistance, the control finish (Spangle™) was always given a rating of 3 and the data reported in Table 2C represents the results of the sample finish composition rating minus the control rating. The black mark/scuff resistance decreased significantly in the surface modified 20 nm silica particle material samples as the amount of surface modified silica increased. A decrease occurred in the surface modified 75 nm silica particle material samples as the amount of surface modified silica was increased.

TABLE 2C

Spangle ™:Surface modified Silica

|  | Soil Resistance | Black Mark/Scuff Resistance |
|---|---|---|
| Spangle ™: 20 nm Surface modified Silica | | |
| 2:1 | 1 | −2 |
| 4:1 | 1 | −1 |
| 8:1 | 1 | −1 |
| Spangle ™: 75 nm Surface modified Silica | | |
| 2:1 | 0 | −1 |
| 4:1 | 0 | −1 |
| 8:1 | 0 | 0 |

Example 3

Finish with Acid-Surface Modified Silica

Silica particles (75 nm and 20 nm) surface modified with an acid-based coupling agent at 20 percent and 30 percent coverages were tested in emulsion-based floor finishes. For 20 percent coverage of 20 nm silica particles, 100.26 grams of Nalco 2327™ were charged to an 8-oz. jar. 4.07 grams of carboxyethylsilanetriol, sodium salt (at 25 wt % in water) and 100.1 grams of D.I. water were mixed and added to the Nalco 2327™ with stirring. The jar was sealed and heated to 80° C. for 17 hours. For 30 percent coverage, 100.06 grams of Nalco 2327™ were charged to an 8-oz. jar. 6.1 grams of carboxyethylsilanetriol, sodium salt (at 25 wt % in water) and 105.0 grams of D.I. water were mixed and added to the Nalco 2327™ with stirring. The jar was sealed and heated to 80° C. for 17 hours.

For 20 percent coverage of the 75 nm silica particles, 100.1 grams of Nalco 2329™ were charged to an 8-oz. jar. 1.03 grams of carboxyethylsilanetriol, sodium salt (at 25 wt % in water) and 100.22 grams of D.I. water were mixed and added to the Nalco 2329 with stirring. The jar was sealed and heated to 80° C. for 17 hours. For 30 percent coverage, 100.18 grams of Nalco 2329™ were charged to an 8-oz. jar. 1.49 grams of carboxyethylsilanetriol, sodium salt (at 25 wt % in water) and 100.75 grams of D.I. water were mixed and added to the Nalco 2329™ with stirring. The jar was sealed and heated to 80° C. for 17 hours.

The resulting compositions were formulated with the available Spangle™ floor finish (according to the solids ratios provided below in Tables 3A and 3B) and then tested for soil resistance and black mark/scuff resistance. Results for the 20 percent particle surface area coverage (both 20 nm silica and 75 nm silica) samples are provided in Table 3A; results for the 30 percent particle surface area coverage (both 20 nm and 75 nm) samples are provided in Table 3B. The soil resistance improved with the addition of the 20 nm acid-surface modified silica particle material. The black mark/scuff resistance increased with the addition of the 20 nm acid-surface modified silica particle material samples at 4:1 ratio of Spangle™ solids to surface modified silica solids. The performance decreased as the amount of surface modified silica was further increased. The 75 nm acid-surface modified silica particle material samples compared negatively to the 20 nm surface modified silica samples.

TABLE 3A

Spangle ™:Surface modified Silica (Acid-based Coupling Agent) - 20% Coverage

|  | Soil Resistance | Black Mark/Scuff Resistance |
|---|---|---|
| Spangle ™: 20 nm Surface modified Silica | | |
| 2:1 | 0.5 | −0.5 |
| 4:1 | 0.0 | 0.5 |
| 8:1 | 0.0 | 0.0 |
| Spangle ™: 75 nm Surface modified Silica | | |
| 2:1 | −1.0 | −1.0 |
| 4:1 | 0.0 | −0.5 |
| 8:1 | 0.0 | 0.0 |

TABLE 3B

Spangle ™:Surface modified Silica (Acid-based Coupling Agent) - 30% Coverage

|  | Soil Resistance | Black Mark/Scuff Resistance |
|---|---|---|
| Spangle ™: 20 nm Surface modified Silica | | |
| 2:1 | 1.0 | −1.0 |
| 4:1 | 0.5 | 0.5 |
| 8:1 | 0.0 | 0.0 |
| Spangle ™: 75 nm Surface modified Silica | | |
| 2:1 | −0.5 | 0.0 |
| 4:1 | 0.0 | 0.5 |
| 8:1 | 0.0 | 0.0 |

Example 4

Finish with Diacid-Surface Modified Silica

Silica particles (20 nm) surface modified with a diacid-based coupling agent were tested. The samples were prepared as follows. A 50 RB flask was charged with maleic anhydride (3.03 g) available from Aldrich Chemical Company of Milwaukee, Wis., and THF (15 g). The anhydride dissolved and then triethylamine (0.077 g) and (3-mercaptopropyl)-trimethoxysilane (5.99 g), both available from Aldrich Chemical Company of Milwaukee, Wis., were added with stirring. The reaction was run at room temperature for 14 hours. The solvent was removed by rotary evaporation to obtain 3-(3-trimethylsilpropylthio) succinic anhydride, a somewhat viscous dark liquid (9.29 g). Nalco 2327™ (50.19 g) was charged to an 8-oz. jar. 3-(3-trimethylsilpropylthio)succin anhydride, (0.742 g), Aqueous Ammonia (2.28 M, 2.7 g) and D.I. water were mixed to give a total of 50 g solution. The solution was added to the Nalco 2327™ with stirring. The jar was sealed and heated to 80° C. for 15 hours. The resultant surface modified silica particle material was formulated with available Spangle™ floor finish at ratios of 2:1 and 4:1 of Spangle™ solids to surface modified silica solids. The sample compositions were then tested for soil resistance and black mark/scuff resistance.

The results are provided in Table 4. The diacid surface modified silica samples performed better in soil resistance (in the case of the higher amount of surface modified silica) and equal in black mark/scuff resistance as compared to the Spangle™ control sample.

TABLE 4

Spangle ™: 20 nm Surface modified Silica (Diacid-based Coupling Agent)

| | Soil Resistance | Black Mark/Scuff Resistance |
|---|---|---|
| 2:1 | 0.5 | 0.0 |
| 4:1 | 0.0 | 0.0 |

Example 5

Acrylic Urethane Copolymer Finish with Surface Modified Inorganic Particle Material Samples were prepared to illustrate performance enhancements available with finish compositions consisting of an acrylic urethane polymer matrix and a surface modified inorganic particle material. In particular, a surface modified inorganic particle material comprised of 20 nm silica particles surface modified with an acid-based coupling agent (with 30 percent surface area coverage) was prepared, as described in Example 3. A finish having a 2:1 Spangle™ solids to surface modified silica solids was formulated. Hybridur® 580 (H580 (acrylic urethane hybrid polymer) was added to prepare several samples having different ratios (by weight of solids) shown in Table 5 below. Soil and black mark/scuff resistance testing were performed, with the results being provided in Table 5. As H580 was added, black mark/scuff resistance continued to improve. Soil resistance was better than the Spangle™ control sample for all formulations.

TABLE 5

(2:1 Spangle ™:Surface modified Silica):Hybridur ® 580

| | Soil Resistance | Black Mark/Scuff Resistance |
|---|---|---|
| 2:1 | 0.5 | 2.5 |
| 4:1 | 0.5 | 1.5 |
| 6:1 | 0.5 | 1.0 |
| 8:1 | 0.5 | 1.0 |

Example 6

Acrylic Urethane Copolymer Finish with Surface Modified Inorganic Particle Material Samples were prepared to further illustrate performance enhancements available with an acrylic urethane polymer matrix and surface modified inorganic particle material composition, and in particular 20 nm silica particles surface modified at 30 percent surface area coverage by an acid-based coupling agent. The surface modified silica particle material was prepared by charging a 100 RB flask, fitted with reflux condenser with D.I. water (24 g) and Sodium Hydroxide (3.46 g). The components were stirred to dissolve. 3-(triethoxysilyl/propionitrile (8.09 g) was charged and the mixture was heated to 100° C. for six hours. The conversion to carboxyethylsilanetriol, sodium salt was followed by IR spectroscopy. The mixture was concentrated via rotary evaporation to 30 wt % solids in water.

At 30 percent coverage, 200 grams of Nalco 2327™ were charged to a 16-oz. jar. 9.96 grams of carboxyethylsilanetriol, sodium salt (at 30 wt % in water, see above) and 200 grams of D.I. water were mixed and added to the Nalco 2327™ with stirring. The jar was sealed and heated to 80° C. for 16 hours. A Spangle™ floor finish was added to the surface modified silica to provide 3:1 and 4:1 (Spangle™ solids to surface modified silica solids) samples. Hybridur® 580 (acrylic urethane hybrid polymer) was then added to the sample formulations at the solids (by weight) ratios shown in Table 6. The resulting samples were tested for soil resistance and black mark/scuff resistance, the results of which are provided in Table 6. As H580 was added, black mark/scuff resistance continued to improve. Soil resistance was better than the control Spangle™ sample for all formulations.

TABLE 6

| | Soil Resistance | Black Mark/Scuff Resistance |
|---|---|---|
| (3:1 Spangle ™:Surface modified Silica):Hybridur ® 580 | | |
| 2:1 | 1.0 | 2.5 |
| 4:1 | 1.0 | 1.5 |
| 6:1 | 1.0 | 2.0 |
| (4:1 Spangle ™:Surface modified Silica):Hybridur ® 580 | | |
| 2:1 | 1.0 | 2.5 |
| 4:1 | 0.5 | 2.0 |
| 6:1 | 0.5 | 1.5 |

Example 7

Taber Abrasion

Taber abrasion was used to determine the abrasion resistance of several sample floor finishes. Sample formulations were prepared including control samples (Spangle™), traditional floor finish with surface modified silica particles at different ratios (Spangle™ and surface modified silica particles with 30% surface area coverage) and traditional floor finish with surface modified particles (same as previous) with varying amounts of acrylic urethane hybrid polymer (H580) added (pursuant to Example 6). Two samples of each formulation were tested and three haze determinations per sample were taken. The haze change versus the number of cycles for the different formulations are presented in Table 7 below. As the haze change increased, the abrasion resistance worsened. The finishes containing only the traditional acrylic polymers (Spangle™) and Spangle™ control with surface modified silica (S:SMS) showed poor abrasion resistance. The formulations containing the Spangle™:surface modified silica:H580 (S:SMS:H580) showed better abrasion resistance. The higher the amount of the H580 added, the better the abrasion resistance.

TABLE 7

| Taber abrasion CS10F (one wheel). 250 g counterweight 125 g | 100 cycles | 300 cycles |
|---|---|---|
| Spangle ™ | 21.39 | 35.86 |
| S:SMS 4:1 | 24.11 | 35.55 |
| S:SMS 3:1 | 20.51 | 30.08 |
| 6(4:1):1 (S:SMS):H580 | 13.72 | 24.32 |
| 4(4:1):1 (S:SMS):H580 | 13.83 | 24.50 |
| 2(4:1):1 (S:SMS):H580 | 11.17 | 21.66 |
| 6(3:1):1 (S:SMS):H580 | 14.26 | 28.09 |

TABLE 7-continued

| Taber abrasion CS10F (one wheel). 250 g counterweight 125 g | 100 cycles | 300 cycles |
|---|---|---|
| 4(3:1):1 (S:SMS):H580 | 13.34 | 22.65 |
| 2(3:1):1 (S:SMS):H580 | 12.71 | 20.76 |

The surface finish compositions of the present invention provide a marked improvement over previous formulations. In particular, by incorporating a surface modified inorganic particles material, the resultant composition was shelf stable, with the particles remaining in suspension for extended periods of time (well in excess of seven days). The surface finish composition exhibits increased hardness and modulus as well as enhanced scratch and soil resistance. Further, the preferred addition of a hybrid acrylic urethane copolymer increases the overall toughness of the composition, as well as enhancing black mark/scuff and abrasion resistance.

Although the present invention has been described with reference to preferred embodiments, workers skilled in the art will recognize that changes can be made in form and detail without departing from the spirit and scope of the present invention.

What is claimed is:

1. An aqueous surface finish composition comprising:
   a film-forming, emulsion-based polymer composition that reversibly crosslinks; and
   a surface modified inorganic particle material dispersed within the emulsion-based polymer composition.

2. The surface finish composition of claim 1, wherein the surface modified inorganic particle material includes surface modified inorganic nanoparticles.

3. The surface finish composition of claim 2, wherein the nanoparticles have an average particle size of 5–150 nm.

4. The surface finish composition of claim 1, wherein the surface modified inorganic particle material comprises inorganic particles surface modified by a coupling agent.

5. The surface finish composition of claim 4, wherein the inorganic particles include particles selected from the group consisting of silica, alumina, zirconia, vanadia, titania, ceria, iron oxide, antimony oxide, and tin oxide, alumina/silica.

6. The surface finish composition of claim 4, wherein the coupling agent is hydrophilic.

7. The surface finish composition of claim 4, wherein the coupling agent is selected from the group consisting of organic acids, organic bases, silane, and combinations thereof.

8. The surface finish composition of claim 4, wherein the inorganic particles are silica and the coupling agent is a silane coupling agent.

9. The surface finish composition of claim 8, wherein the silane coupling agent is a polyethylene glycol-based silane coupling agent.

10. The surface finish composition of claim 8, wherein the silane coupling agent includes a component selected from the group consisting of carboxylic acids, sulfonic acids, and phosphonic acids.

11. The surface finish composition of claim 8, wherein the silane coupling agent includes a component selected from the group consisting of quaternary amines or protonated amines.

12. The surface finish composition of claim 8, wherein the coupling agent is a carboxyethylsilanetriol, sodium salt-based silane coupling agent.

13. The surface finish composition of claim 8, wherein the coupling agent is a 3-(3-trimethylsilylpropylthio)succinic anhydride-based silane coupling agent.

14. The surface finish composition of claim 4, wherein the inorganic particles have an outer surface at least partially covered with the coupling agent, and further wherein the surface modified inorganic particle material is characterized by a coupling agent surface coverage of 5–100%.

15. The surface finish composition of claim 14, wherein the coupling agent surface coverage is in the range of 20–50%.

16. The surface finish composition of claim 1, wherein a by weight ratio of polymer composition solids to surface modified inorganic particle material solids is in the range of 1:1–10:1.

17. The surface finish composition of claim 16, wherein the ratio is in the range of 3:1–5:1.

18. The surface finish composition of claim 1, wherein the emulsion-based polymer composition includes an acrylic polymer.

19. The surface finish composition of claim 1, wherein the emulsion-based polymer composition includes an acrylic polymer and a urethane polymer.

20. The surface finish composition of claim 1, wherein the emulsion-based polymer composition includes a hybrid acrylic urethane polymer.

21. The surface finish composition of claim 20, wherein the emulsion-based polymer composition includes the hybrid acrylic urethane polymer mixed with an acrylic polymer.

22. The surface finish composition of claim 1, wherein the aqueous composition is characterized by an absence of surface modified inorganic particle precipitation from the emulsion-based polymer composition for at least seven days.

23. The surface finish composition of claim 1, wherein the surface is selected from the group consisting of a floor, a wall, and a bathroom surface.

24. The surface finish composition of claim 1, wherein the surface modified inorganic particle material includes silica nanoparticles surface modified by an acid-based silane coupling agent.

25. A method of finishing a surface, the method comprising coating the surface with the surface finishing composition according to claim 1.

26. A process of improving the performance of an aqueous, emulsion-based polymer floor finish composition that reversibly crosslinks, the process comprising dispersing a surface modified inorganic particle material within the emulsion.

27. The process of claim 26, wherein the surface modified inorganic particle material comprises inorganic particle surface modified by a coupling agent.

28. The process of claim 27, wherein the surface modified inorganic particle material includes inorganic particles having an outer surface partially covered with a coupling agent, and further wherein the surface modified inorganic particle material is characterized by a coupling agent surface coverage of 5–100%.

29. A method of preparing an aqueous surface finish composition, the method comprising:
   providing a film-forming, emulsion-based polymer composition that reversibly crosslinks; and
   dispersing a surface modified inorganic particle material within the emulsion-based polymer composition.

30. The method of claim 29, further comprising:
   preparing a surface modified inorganic particle material for dispersing in the emulsion-based polymer composition.

31. The method of claim 30, wherein preparing the surface modified inorganic particle material includes surface modifying inorganic particles with a coupling agent.

32. The method of claim 29, wherein the surface modified inorganic particle material includes silica particles, the method further comprising:

storing the composition in a container for at least seven days following the step of dispersing the surface modified inorganic particle material, wherein the silica particles do not precipitate out of the aqueous composition during the step of storing.

* * * * *

UNITED STATES PATENT AND TRADEMARK OFFICE
CERTIFICATE OF CORRECTION

PATENT NO. : 6,727,309 B1
DATED : April 27, 2004
INVENTOR(S) : Paiva, Adriana

It is certified that error appears in the above-identified patent and that said Letters Patent is hereby corrected as shown below:

Column 12,
Line 59, please delete "succin" and insert in place thereof -- succinic --.
Line 59, please delete "," following "anhydride".

Column 13,
Line 30, please insert -- ) -- following "(H580".
Line 63, please delete "/" following "triethoxysilyl" and insert in place thereof -- ) --.

Signed and Sealed this

Third Day of August, 2004

JON W. DUDAS
*Acting Director of the United States Patent and Trademark Office*